US012664700B2

(12) United States Patent
Zhou et al.

(10) Patent No.: US 12,664,700 B2
(45) Date of Patent: Jun. 23, 2026

(54) IMAGE DRAWING PROCESS GENERATION METHOD AND APPARATUS, DEVICE, AND STORAGE MEDIUM

(71) Applicant: Beijing Bytedance Network Technology Co., Ltd., Beijing (CN)

(72) Inventors: Caijin Zhou, Beijing (CN); Xinghong Hu, Beijing (CN); Xiwen Cheng, Beijing (CN); Boheng Qiu, Beijing (CN); Yuyan Wang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 637 days.

(21) Appl. No.: 18/023,953

(22) PCT Filed: Aug. 12, 2021

(86) PCT No.: PCT/CN2021/112184
§ 371 (c)(1),
(2) Date: Aug. 7, 2023

(87) PCT Pub. No.: WO2022/048421
PCT Pub. Date: Mar. 10, 2022

(65) Prior Publication Data
US 2024/0242401 A1     Jul. 18, 2024

(30) Foreign Application Priority Data
Sep. 2, 2020     (CN) .......................... 202010909045.6

(51) Int. Cl.
*G06T 11/23*     (2026.01)
*G06T 11/60*     (2026.01)
*G06V 10/74*     (2022.01)

(52) U.S. Cl.
CPC .............. *G06T 11/23* (2026.01); *G06T 11/60* (2013.01); *G06V 10/761* (2022.01)

(58) Field of Classification Search
CPC ........ G06T 11/203; G06T 11/60; G06T 11/80; G06V 10/761; G06F 3/04847; G06F 9/451
See application file for complete search history.

(56) References Cited

U.S. PATENT DOCUMENTS 7,170,524 B2     1/2007 Fujita
2016/0328866 A1*  11/2016 Neulander .............. G06T 11/20
(Continued)

FOREIGN PATENT DOCUMENTS

CN      102938157 A     2/2013
CN      103793150 A     5/2014
(Continued)

OTHER PUBLICATIONS

International Search Report and Written Opinion mailed Sep. 28, 2021 in connection with PCT/CN2021/112184.

*Primary Examiner* — Said Broome
*Assistant Examiner* — Andrew Shin
(74) *Attorney, Agent, or Firm* — Astute IP Law Group

(57)     ABSTRACT

An image drawing process generation method and apparatus, a device, and a storage medium. The method comprises: determining the brush size and brush position information of a brush object on a first brush layer on the basis of a detail parameter value of a pixel sampling point on the first brush layer set for a target image (S101); then, saving the brush object on the first brush layer into a brush queue corresponding to the first brush layer (S102); and finally, generating, on the basis of an attribute of each brush object in the brush queue, a drawing process of a target style image corresponding to the target image (S103). The brush size and brush position information of a corresponding brush object are
(Continued)

determined on the basis of a detail parameter value of each pixel sampling point, and determinations of attributes of brush objects are independent from each other, which improves the determination efficiency of the attributes of the brush objects, thereby improving the generation efficiency of an image drawing process.

18 Claims, 5 Drawing Sheets

(56)              References Cited

U.S. PATENT DOCUMENTS

2019/0205025  A1       7/2019   Dong et al.
2019/0228587  A1*    7/2019   Mordvintsev  ........... G06T 19/20

FOREIGN PATENT DOCUMENTS

| CN | 103903293 | A | 7/2014 |
|----|-----------|---|--------|
| CN | 104166970 | A | 11/2014 |
| CN | 108089761 | A | 5/2018 |
| CN | 112051959 | A | 12/2020 |

* cited by examiner

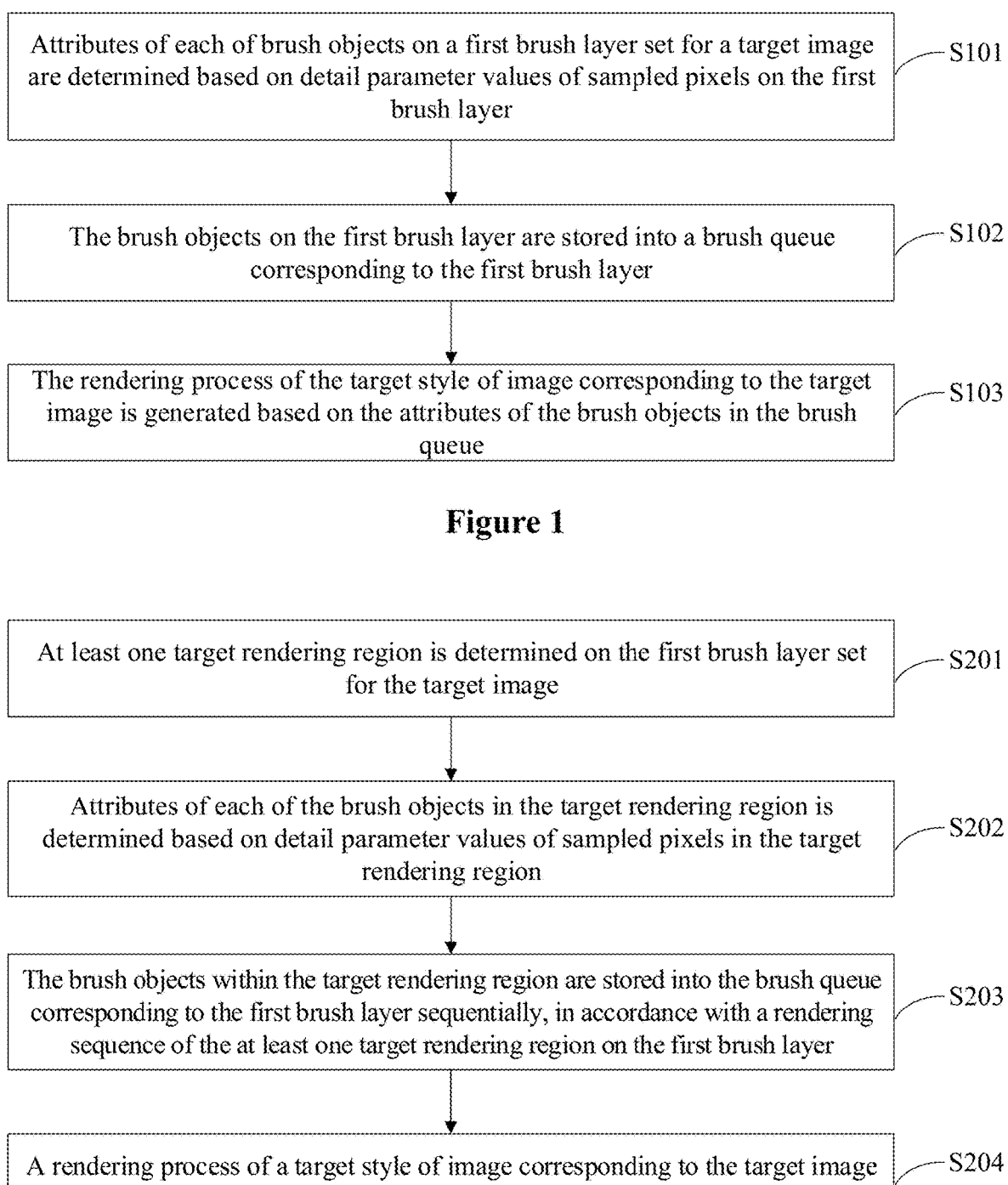

Attributes of each of brush objects on a first brush layer set for a target image are determined based on detail parameter values of sampled pixels on the first brush layer — S101

The brush objects on the first brush layer are stored into a brush queue corresponding to the first brush layer — S102

The rendering process of the target style of image corresponding to the target image is generated based on the attributes of the brush objects in the brush queue — S103

Figure 1

At least one target rendering region is determined on the first brush layer set for the target image — S201

Attributes of each of the brush objects in the target rendering region is determined based on detail parameter values of sampled pixels in the target rendering region — S202

The brush objects within the target rendering region are stored into the brush queue corresponding to the first brush layer sequentially, in accordance with a rendering sequence of the at least one target rendering region on the first brush layer — S203

A rendering process of a target style of image corresponding to the target image is generated based on the attributes of the brush objects in the brush queue — S204

Figure 2

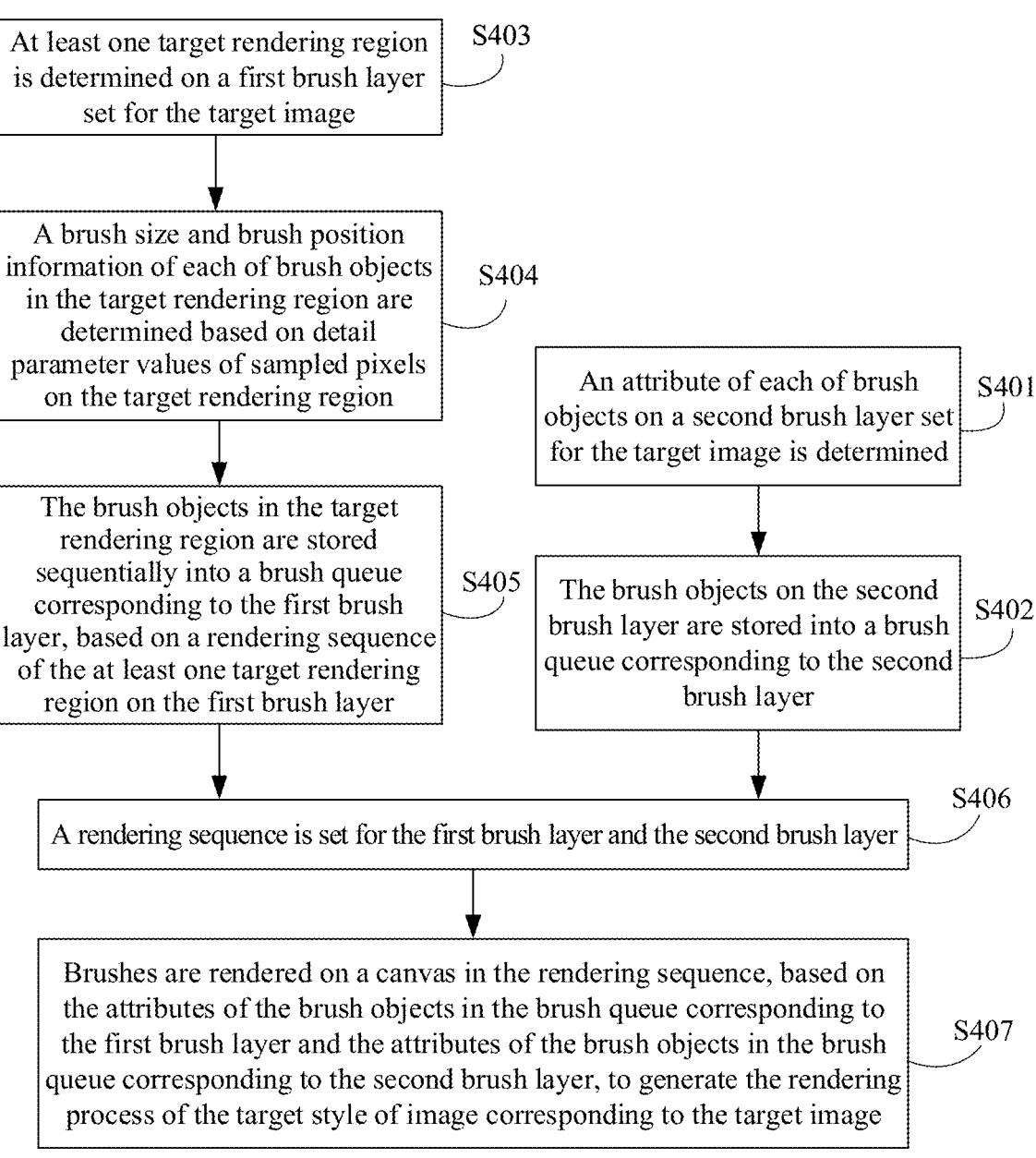

At least one target rendering region is determined on a first brush layer set for the target image          S403

A brush size and brush position information of each of brush objects in the target rendering region are determined based on detail parameter values of sampled pixels on the target rendering region          S404

An attribute of each of brush objects on a second brush layer set for the target image is determined          S401

The brush objects in the target rendering region are stored sequentially into a brush queue corresponding to the first brush layer, based on a rendering sequence of the at least one target rendering region on the first brush layer          S405

The brush objects on the second brush layer are stored into a brush queue corresponding to the second brush layer          S402

A rendering sequence is set for the first brush layer and the second brush layer          S406

Brushes are rendered on a canvas in the rendering sequence, based on the attributes of the brush objects in the brush queue corresponding to the first brush layer and the attributes of the brush objects in the brush queue corresponding to the second brush layer, to generate the rendering process of the target style of image corresponding to the target image          S407

Figure 4

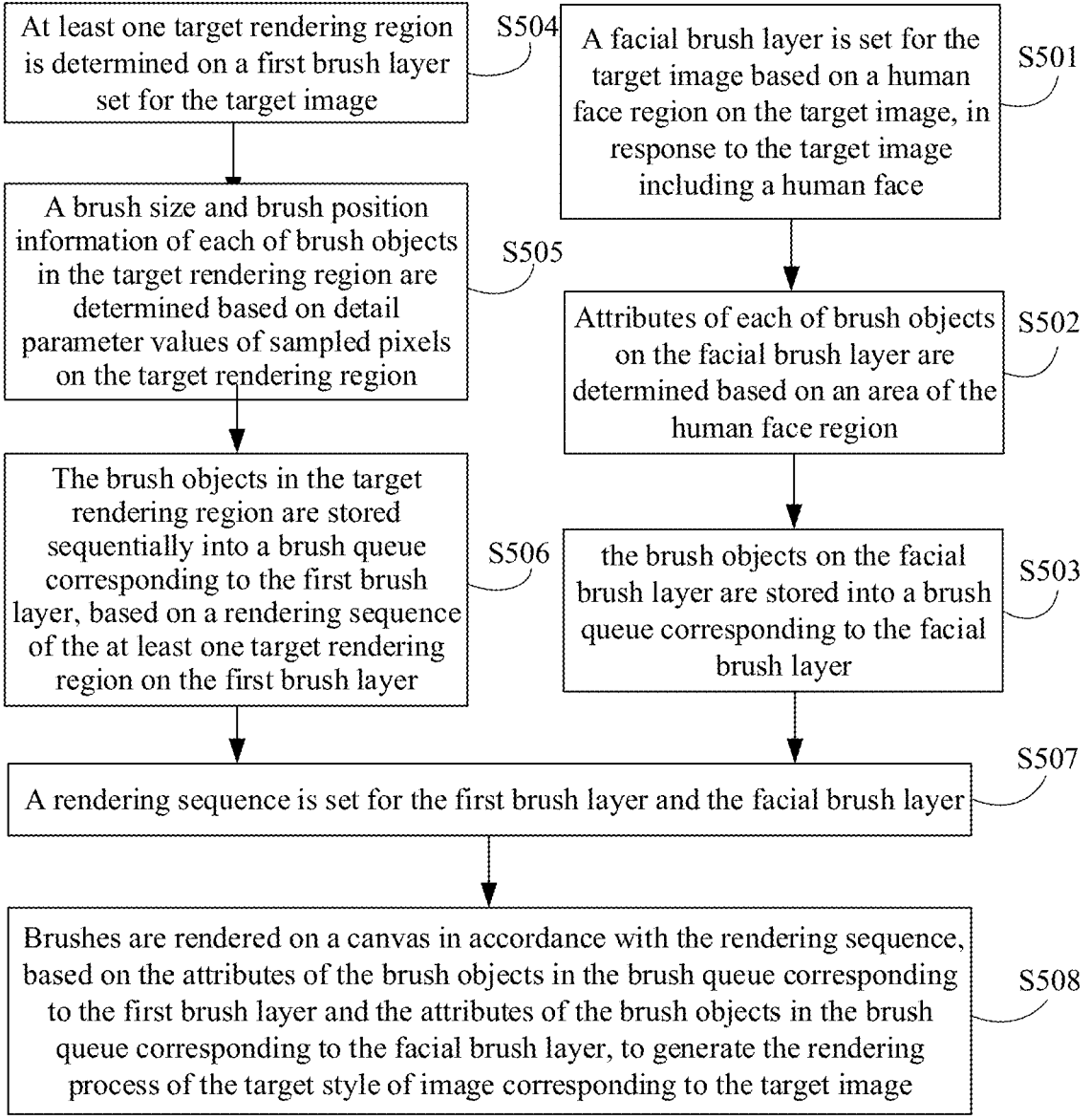

At least one target rendering region is determined on a first brush layer set for the target image          S504

A facial brush layer is set for the target image based on a human face region on the target image, in response to the target image including a human face          S501

A brush size and brush position information of each of brush objects in the target rendering region are determined based on detail parameter values of sampled pixels on the target rendering region          S505

Attributes of each of brush objects on the facial brush layer are determined based on an area of the human face region          S502

The brush objects in the target rendering region are stored sequentially into a brush queue corresponding to the first brush layer, based on a rendering sequence of the at least one target rendering region on the first brush layer          S506 the brush objects on the facial brush layer are stored into a brush queue corresponding to the facial brush layer          S503

A rendering sequence is set for the first brush layer and the facial brush layer          S507

Brushes are rendered on a canvas in accordance with the rendering sequence, based on the attributes of the brush objects in the brush queue corresponding to the first brush layer and the attributes of the brush objects in the brush queue corresponding to the facial brush layer, to generate the rendering process of the target style of image corresponding to the target image          S508

Figure 5

IMAGE DRAWING PROCESS GENERATION METHOD AND APPARATUS, DEVICE, AND STORAGE MEDIUM

This application is a national stage of International Application No. PCT/CN2021/112184, filed on Aug. 12, 2021, which claims priority to Chinese Patent Application No. 202010909045.6, titled "IMAGE DRAWING PROCESS GENERATION METHOD AND APPARATUS, DEVICE, AND STORAGE MEDIUM", filed on Sep. 2, 2020 with the China National Intellectual Property Administration, both of which are incorporated herein by reference in their entireties.

FIELD

The present disclosure relates to the field of data processing, and in particular to a method and a device for generating an image rendering process, an apparatus, and a storage medium.

BACKGROUND

With the development of computer technology, various functional software applications based on computer technology are increasingly demanded by users. It is widely concerned on how to present a rendering process of an image in a specific style corresponding to a target image, in order to enable the users to learn an image drawing method from the rendering process with more fun.

During a generation of an image rendering process, attributes, such as, a size and a position, of a brush involved in drawing the image need to be determined. Conventionally, the attributes of the brush is determined by: establishing a mathematical model for each brush involved in drawing the image, taking the attributes of the brush as variables of the mathematical model, and solving an optimal solution to the mathematical model.

Generally, a large quantity of brushes is involved in drawing the image, and thus the calculation of the optimal solution to the mathematical model has high performance consumption. Therefore, the determination of the attributes of the brush involved in drawing the image through the above method is inefficient, and thereby the generation of the image rendering process based on the attributes of the brush has a low efficiency and is time-consuming.

SUMMARY

In order to solve, or at least partially solve, the above technical problems, a method and a device for generating an image rendering process, an apparatus, and a storage medium are provided according to the present disclosure, which can improve an efficiency and reduce a time consumption in the generating the image rendering process.

A method for generating an image rendering process is provided in an embodiment of the present disclosure. The method includes:

determining attributes of each of brush objects on a first brush layer set for a target image, based on detail parameter values of sampled pixels on the first brush layer, where the attributes include a brush size and brush position information;

storing the brush objects on the first brush layer into a brush queue corresponding to the first brush layer; and generating a rendering process of a target style of image corresponding to the target image, based on the attributes of the brush objects in the brush queue.

In an embodiment, the determining attributes of each of brush objects on a first brush layer set for a target image, based on detail parameter values of sampled pixels on the first brush layer, includes:

determining at least one target rendering region on the first brush layer set for the target image; and determining the attributes of each of brush objects in the target rendering region based on the detail parameter values of the sampled pixels in the target rendering regions.

The storing the brush objects on the first brush layer into a brush queue corresponding to the first brush layer includes:

storing the brush objects within the target rendering region into the brush queue corresponding to the first brush layer sequentially, in accordance with a rendering sequence of the at least one target rendering region on the first brush layer.

In an embodiment, the determining attributes of each of brush objects on a first brush layer set for a target image, based on detail parameter values of the sampled pixels on the first brush layer, includes:

sampling pixels on the first brush layer evenly based on a preset brush interval, to obtain the sampled pixels on the first brush layer;

calculating a detail parameter value of each of the sampled pixels, and determining whether the detail parameter value is within a detail range corresponding to the preset brush interval, where the detail parameter value indicates a richness of details of the sampled pixel; and determining the brush position information of the brush object based on position information of the sampled pixel and determining a brush size corresponding to the preset brush interval as the brush size of the brush object, in response to the detail parameter value being within the detail range corresponding to the preset brush interval.

In an embodiment, the calculating a detail parameter value of each of the sampled pixels includes:

calculating a gradient value of the sampled pixel in a first direction and a gradient value of the sampled pixel in a second direction;

constructing a structure tensor matrix corresponding to the sampled pixel, based on the gradient value of the sampled pixel in the first direction and the gradient value of the sampled pixel in the second direction; and performing eigen decomposition on the structure tensor matrix to obtain the detail parameter value of the sampled pixel, where the detail parameter value is a greater eigenvalue of two eigenvalues obtained through the eigen decomposition, and the detail parameter value indicates a richness of details of the sampled pixel.

In an embodiment, the attributes of the brush object further include a brush direction, and the method further includes:

determining the brush direction of the brush object corresponding to the sampled pixel, based on a direction vector corresponding to a smaller eigenvalue of the two eigenvalues.

In an embodiment, before storing the brush objects within the target rendering region into the brush queue corresponding to the first brush layer sequentially, in accordance with a rendering sequence of the at least one target rendering region on the first brush layer, the method further includes:

disrupting a rendering sequence of the brush objects within the target rendering region randomly.

In an embodiment, the attributes of the brush object further include a brush color; and the brush color is determined based on a color value of a pixel corresponding to the brush position information of the brush object on the target image.

In an embodiment, before generating a rendering process of a target style of image corresponding to the target image, based on the attributes of the brush objects in the brush queue, the method further includes:

determining attributes of each of brush objects on a second brush layer set for the target image; and storing the brush objects on the second brush layer, into a brush queue corresponding to the second brush layer.

The generating a rendering process of a target style of image corresponding to a target image, based on the attributes of the brush objects in the brush queue includes:

setting a rendering sequence for the first brush layer and the second brush layer; and rendering the brush objects on a canvas in accordance with the rendering sequence, based on the attributes of the brush objects in the brush queue corresponding to the first brush layer and the attributes of the brush objects in the brush queue corresponding to the second brush layer, to generate the rendering process of the target style of image corresponding to the target image.

In an embodiment, the determining attributes of each of brush objects on a second brush layer set for the target image includes:

sampling pixels on the second brush layer evenly based on a preset brush interval, to obtain sampled pixels on the second brush layer; and determining position information of the sampled pixels as the brush position information of the brush objects on the second brush layer, and determining a preset brush size corresponding to the preset brush interval as the brush size of the brush object.

In an embodiment, before generating a rendering process of a target style of image corresponding to the target image, based on the attributes of the brush object in the brush queue, the method further includes:

setting, in response to the target image including a human face, a facial brush layer for the target image based on a human face region on the target image;

determining attributes of each of brush objects on the facial brush layer based on an area of the human face region; and storing the brush objects on the facial brush layer into a brush queue corresponding to the facial brush layer.

The generating a rendering process of a target style of image corresponding to a target image, based on the attributes of the brush objects in the brush queue, includes:

setting a rendering sequence for the first brush layer and the facial brush layer; and rendering the brush objects on a canvas in accordance with the rendering sequence, based on the attributes of the brush objects in the brush queue corresponding to the first brush layer and the attributes of the brush objects in the brush queue corresponding to the facial brush layer, to generate the rendering process of the target style of image corresponding to the target image.

In an embodiment, determining at least one target rendering region on the first brush layer set for the target image includes:

determining the at least one target rendering region on the first brush layer set for the target image, based on a similarity of color values of pixels on the target image.

In an embodiment, after generating a rendering process of a target style of image corresponding to the target image, based on the attributes of the brush objects in the brush queue, the method further includes:

applying a bump mapping effect on the target style of image corresponding to the target image, after generating the target style of image.

In a second aspect, a device for generating an image rendering process is provided according to the present disclosure. The device includes: a first determination module, a first storage module and a generation module.

The first determination module is configured to determine attributes of each of brush objects on a first brush layer set for a target image, based on detail parameter values of sampled pixels on the first brush layer, where the attributes include a brush size and brush position information.

The first storage module is configured to store the brush objects on the first brush layer into a brush queue corresponding to the first brush layer.

The generation module is configured to generate a rendering process of a target style of image corresponding to the target image, based on the attributes of the brush objects in the brush queue.

In a third aspect, a computer-readable storage medium is provided according to the present disclosure. The computer-readable storage medium stores instructions. The instructions, when executed on a terminal device, cause the terminal device to implement the above method for generating the image rendering process.

In a fourth aspect, an apparatus is provided according to the present disclosure. The apparatus includes a memory, a processor, and a computer program stored in the memory and executable on the processor. The processor, when executes the computer program, performs the above method for generating the image rendering process.

Advantageous of the technical solutions provided in the embodiments of the present disclosure, compared with the conventional technology, are described as follows.

In the method for generating the image rendering process according to the embodiments of the present disclosure, the attributes, such as the brush size and brush position information, of each of the brush objects on the first brush layer set for the target image are determined based on the detail parameter values of the sampled pixels on the first brush layer. Then, the brush objects on the first brush layer are stored into the brush queue corresponding to the first brush layer. Finally, the rendering process of the target style of image corresponding to the target image is generated based on the attributes of the brush object in the brush queue. In the present disclosure, the brush size and the brush position information of a corresponding brush object are determined based on the detail parameter values of sampled pixels. Determinations of the attributes of the brush objects are independent from each other, thus avoiding a mathematical problem of solving an optimal solution to a complex mathematical model. Hence, an efficiency of determining the attributes of the brush objects is improved, and an efficiency of generating the image rendering process based on the attributes of the brush objects is thereby improved.

BRIEF DESCRIPTION OF THE DRAWINGS

The drawings herein are incorporated into the specification and constitute a part of the specification. The drawings show embodiments of the present disclosure. The drawings and the specification are used to explain the principle of the present disclosure.

In order to more clearly illustrate technical solutions in embodiments of the present disclosure or in the conventional technology, the drawings to be used in the description of the embodiments or the conventional technology are briefly described below. It is apparent that other drawings may be obtained by those skilled in the art from the drawings without any creative effort.

FIG. 1 is a flowchart of a method for generating an image rendering processing according to an embodiment of the present disclosure;

FIG. 2 is a flowchart of a method for generating an image rendering process according to another embodiment of the present disclosure;

FIG. 4 is a flowchart of a method for generating an image rendering process according to another embodiment of the present disclosure;

FIG. 5 is a flowchart of a method for generating an image rendering process according to another embodiment of the present disclosure;

DETAILED DESCRIPTION

Figure 3:
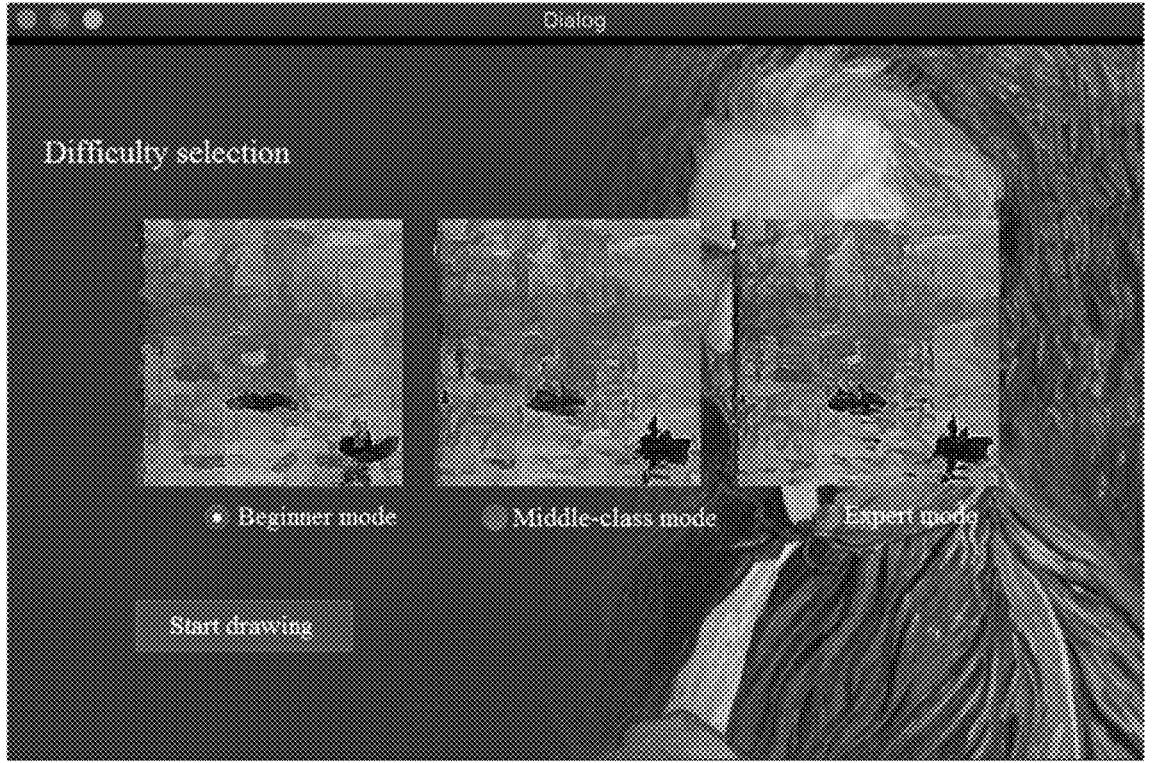
FIG. 3 is a schematic diagram of a selection interface for generation modes of image rendering processes corresponding to different difficulty coefficients according to an embodiment of the present disclosure.

Hereafter the technical solutions in the embodiments of the present disclosure are described in further detail, in order to make the objectives, features, and advantage of the present disclosure more apparent and understandable. It should be noted that embodiments of the present disclosure and features in the embodiments may be combined with each other as long as there is no conflict.

Many specific details are set forth in the following description to facilitate a full understanding of the present disclosure. However, the present disclosure may be implemented in other ways different from those described herein. Apparently, the embodiments in the specification are only a part of, rather than all, the embodiments of the present disclosure.

A user can learn an image drawing method while watching the rendering process, by displaying the image rendering process, which can achieve a purpose of "teaching through lively activities" to a certain extent.

To this end, a method for generating an image rendering process is provided in the present disclosure. First, attributes, such as a brush size and brush position information, of each of brush objects on a first brush layer set for a target image are determined based on detail parameter values of sampled pixels on the first brush layer. Then, the brush objects on the first brush layer are stored in a brush queue corresponding to the first brush layer. Finally, a rendering process of a target style of image corresponding to the target image is generated based on the attributes of the brush objects in the brush queue.

In the present disclosure, the brush size and the brush position information of the brush object are determined based on the detail parameter values of the sampled pixels.

Determinations of the attributes of the brush object are independent from each other, thus avoiding a mathematical problem of solving an optimal solution to a complex mathematical model. Hence, an efficiency of determining the attributes of the brush objects is improved to a certain extent, and thereby an efficiency of generating the image rendering process is improved.

Based on the above, a method for generating an image rendering process is provided according to an embodiment of the present disclosure. FIG. 1 shows a flowchart of a method for generating an image rendering process according to an embodiment of the present disclosure. Referring to FIG. 1, the method includes S101 to S103.

In S101, attributes of each of brush objects on a first brush layer set for a target image are determined based on detail parameter values of sampled pixels on the first brush layer.

The attributes of the brush object include a brush size and brush position information.

In an embodiment of the present disclosure, the target image is first determined before the image rendering process is generated. The target image may be in any of various types, for example, the target image may be a person image, a landscape image, or the like.

In an optional implementation, the target image may be determined by a user. Specifically, the user may select any image from an album in a terminal, as the target image. Alternatively, the image may be obtained by triggering a camera function and using an image captured by the camera as the target image. Specific manner of determining the target image is not limited in the embodiments of the present disclosure.

After the target image is determined, a corresponding image rendering process is generated based on the target image. Specifically, a rendering process of a target style of image corresponding to the target image is generated, where the target style of image refers to a type of image with an artistic effect, such as an oil painting style, a sketch style, or the like.

In practice, after the target image is determined, a first brush layer is set for the target image, and the rendering process of the target style of image corresponding to the target image is generated by rendering brush objects on the first brush layer.

In an embodiment of the present disclosure, after the first brush layer is set for the target image, pixels on the first brush layer are sampled based on a preset brush interval, and then the brush size and brush position information of each of the brush objects on the first brush layer are determined based on the detail parameter values of each of the sampled pixels. The detail parameter value is used to indicate a richness of details of the sampled pixel. The brush interval indicates a distance between adjacent brushes.

In an embodiment of the present disclosure, after the sampled pixels on the first brush layer are determined, the detail parameter values of each of the sampled pixels are calculated. Then, it is determined whether the detail parameter value is within a detail range corresponding to the preset brush interval for sampling. In response to the detail parameter value being within the detail range, position information of the sampled pixel is determined as the brush position information of the brush object, and a brush size corresponding to the preset brush interval is determined as the brush size of the brush object. Specific implementations are introduced in the subsequent embodiments, which will not be repeated herein.

In S102, the brush objects on the first brush layer are stored into a brush queue corresponding to the first brush layer.

In an embodiment of the present disclosure, a brush queue is pre-created for the first brush layer of the target image. After each brush object on the first brush layer and attributes such as, the brush position information and the brush size, of the brush object are determined, the brush object is stored in the brush queue corresponding to the first brush layer. The brush queue is used for generating the rendering process of the target style of image corresponding to the target image.

In S103, the rendering process of the target style of image corresponding to the target image is generated based on the attributes of the brush objects in the brush queue.

In an embodiment of the present disclosure, brushes are rendered on a canvas based on the attributes of each of the brush objects in the brush queue, thereby generating the rendering process of the target style of image corresponding to the target image. The target style of image may be an oil painting image, a cartoon image, a sketch image, or the like. The canvas refers to a region for rendering the brushes on an image rendering interface.

In practice, the brush objects in the brush queue corresponding to the first brush layer are de-queued sequentially, and the brushes are rendered on the canvas sequentially based on the attributes of the de-queued brush objects.

In an embodiment of the present disclosure, the rendering process of the target style of image corresponding to the target image is generated based on rendering processes of the brush objects in the brush queue. The rendering process of the target style of image refers to a rendering process of the target style of image corresponding to the target image, such as an oil painting image. A user can learn a method for drawing an image while watching the image rendering process, which, to a certain extent, can achieve the purpose of "teaching through lively activities".

In an optional implementation, the generated image rendering process may be in a form of an image rendering video. In an example, the brush objects on the first brush layer are rendered based on the attributes of the brush objects in the brush queue corresponding to the first brush layer, to generate a video of rendering the target style of image corresponding to the target image. Thereby, a user can learn how to draw an image by watching the video.

In the method for generating the image rendering process according to the embodiments of the present disclosure, the attributes, such as the brush size and the brush position information, of each of the brush objects on the first brush layer set for the target image are determined based on the detail parameter values of the sampled pixels on the first brush layer. Then, the brush objects on the first brush layer are stored into the brush queue corresponding to the first brush layer. Finally, the rendering process of the target style of image corresponding to the target image is generated based on the attributes of the brush object in the brush queue. In the present disclosure, the brush size and brush position information of the brush object are determined based on the detail parameter values of sampled pixels. Determinations of the attributes of the brush object are independent from each other, thus avoiding a mathematical problem of solving an optimal solution to a complex mathematical model. Hence, an efficiency of determining the attributes of the brush objects is improved, and an efficiency of generating the image rendering process based on the attributes of the brush objects is thereby improved.

In order to be closer to a true image drawing process, a method for generating an image rendering process is further provided in another embodiment of the present disclosure. FIG. 2 is a flowchart of a method for generating an image rendering process according to an embodiment of the present disclosure. Referring to FIG. 2, the method includes S201 to S204.

In S201, at least one target rendering region is determined on the first brush layer set for the target image.

During a true image drawing process, a user usually draws the image region by region. That is, an image on one region is drawn with a brush first, and then the image on another region is drawn. In an embodiment of the present disclosure, in order to be closer to the true image drawing process, at least one target rendering region is determined on the first brush layer after the first brush layer is set. The target rendering region is a unit for rendering the first brush layer of the target image.

In an optional implementation, the target image may be divided into several regions, and each of the regions is determined as the target rendering region of the first brush layer.

In another optional implementation, at least one target rendering region may be determined on the first brush layer set for the target image, based on a similarity of color values of the pixels on the target image.

In an example, the similarity of color values of adjacent pixels on the target image is calculated. A region formed by several adjacent pixels, among which the similarity of color values is greater than a preset similarity threshold, is determined as a target rendering region on the first brush layer. In an embodiment of the present disclosure, the similarity of color values is used as a standard for dividing the target rendering regions, which can be closer to the true image drawing process to a certain extent.

In S202, attributes of each of the brush objects in the target rendering region is determined based on detail parameter values of sampled pixels in the target rendering region.

In an embodiment of the present disclosure, pixels in the target rendering region are sampled. A brush size and brush position information of each of the brush objects in the target rendering region are determined based on the detail parameter values of the sampled pixels. A detail parameter value is used to indicate a richness of details of a sampled pixel.

In an embodiment of the present disclosure, after the at least one target rendering region on the first brush layer is determined, pixels in the target rendering region are sampled, and then the brush object in the target rendering region and the attributes of the brush object are determined based on the detail parameter values of the sampled pixels. The attributes of the brush object include at least the brush size and the brush position information. The brush size indicates a size of a brush corresponding to a brush object, such as a large brush, a medium brush, a small brush, or the like. The brush position information indicates a rendering position of the brush corresponding to the brush object. The brush position may be two-dimensional coordinates. A calculation of the detail parameter values of the sampled pixels will be introduced in the following embodiments.

In an optional implementation, several brush sizes may be preset. For example, three brush sizes, i.e., large, medium, and small, are preset. The brush intervals are preset for the respective brush sizes. The brush interval indicates a distance between adjacent brushes. That is, a correspondence between the brush size and the brush interval is preset. A great brush size corresponds to a great brush interval, and a small brush size corresponds to a small brush interval.

In practice, image rendering processes with different difficulty levels may be generated, such that users with different foundations can learn to draw an image based on the image rendering processes with different difficulty levels. To this end, in an embodiment of the present disclosure, videos of rendering images with different difficulty levels may be generated by setting a quantity of brush sizes. For example, an image rendering process with a low difficulty coefficient may be generated by setting three brush sizes, i.e., large, medium and small, which is suitable for a user with a poor foundation to learn an image drawing method. An image rendering process with a high difficulty coefficient may be generated by setting five different brush sizes, which is suitable for a user with a strong foundation to learn the image drawing method. The user can select a difficulty coefficient as required, so as to generate the image rendering process corresponding to the difficulty coefficient.

FIG. 3 is a schematic diagram of a selection interface for generation modes of image rendering processes corresponding to different difficulty coefficients according to an embodiment of the present disclosure. Referring to FIG. 3, the interface shows a beginner mode, a middle-class mode, and an expert mode, which correspond to image rendering processes with different difficulty coefficients.

Additionally, since a position with a high richness of details in an image is rendered more finely, this position is usually rendered using a small brush size. To this end, a correspondence between the brush size and a detail range is preset in an embodiment of the present disclosure. The detail range indicates a certain numerical range of the detail parameter value. The greater the detail parameter value corresponding to the detail range, the higher the richness of details, and the smaller the set brush size. Since there is a correspondence between the brush size and the brush interval, there is also a correspondence between the brush interval and the detail range. Generally, a greater detail parameter value corresponds to a detail range corresponding to a smaller brush size and a smaller brush interval.

After completing the above settings, pixels in the target rendering region are sampled evenly based on the brush interval corresponding to each of the brush sizes, to obtain sampled pixels in the target rendering region. Then, the detail parameter value of each of the sampled pixels is calculated. Specifically, the detail parameter value indicates a richness of details of a corresponding sampled pixel. Next, it is determined whether the detail parameter value is in a detail range corresponding to the brush interval. The detail parameter value in the detail range indicates that the brush size corresponding to the brush interval can satisfy drawing of details at a position of the sampled pixel. In such case, the position information of the sampled pixel may be determined as the brush position information of the brush object, and a brush size corresponding to the brush interval may be determined as the brush size of the brush object. The brush object, whose brush position information and brush size are determined, is stored.

The detail parameter value being not within the detail range indicates that the brush size corresponding to the brush interval is not suitable for drawing details at the position of the sampled pixel. In such case, it is not necessary to determine the attributes of the brush object based on the sampled pixel. Therefore, it may be understood that after the pixels are sampled in the target rendering region evenly based on the brush interval, positions of determined brush objects are not even, and each of the positions is determined based on the richness of details at the corresponding position.

Based on the above method, it is possible to determine attributes of each of the brush objects that are obtained by sampling based on the brush intervals. The attributes include such as the brush size and the brush position information. Then, the determined brush objects are used as brush objects in the target rendering region on the first brush layer. It can be understood that one target rendering region may include brush objects having various brush sizes. In order to be closer to the true image drawing process, a rendering sequence of brush objects with the same brush size may be disrupted randomly, to realize an irregular and random rendering of brushes in the same target rendering region, which is more in line with the true image drawing process.

In an embodiment of the present disclosure, the brush size and the brush position information of each of the brush objects in each target rendering region on the first brush layer may be determined through the above method. In this way, the brush size and the brush position information of each of the brush objects on the first brush layer is determined.

In S203, the brush objects within the target rendering region are stored into the brush queue corresponding to the first brush layer sequentially, in accordance with a rendering sequence of the at least one target rendering region on the first brush layer.

In an embodiment of the present disclosure, the brush queue is established for the first brush layer, and then the brush objects in the respective target rendering regions are stored in the brush queue corresponding to the first brush layer. The attributes of each of the brush objects include the brush size and the brush position information.

In practice, since the brush queue has a characteristic of first-in-first-out, a sequence of storing the brush objects in the brush queue determines a rendering sequence of the brush objects in the brush queue to a certain extent. In an embodiment of the present disclosure, after the attributes of brush objects in a target rendering region on the first brush layer are determined, the brush objects in the target rendering region may be stored into the brush queue corresponding to the first brush layer in the order of the brush sizes from largest to smallest. Hence, when the first brush layer is rendered, the image may be rendered by using a large brush first, then a middle brush, and finally a small brush, which is close to a true image drawing process and improves user experience.

In practice, the rendering sequence of the target rendering regions on the first brush layer is preset, and the brush objects in the respective target rendering regions are sequentially stored into the brush queue corresponding to the first brush layer in the rendering sequence.

In an optional implementation, the rendering sequence of the target rendering regions may be set conventionally from top to bottom, or from left to right on a canvas. Correspondingly, the brush objects in the corresponding target rendering region may be stored into the brush queue corresponding to the first brush layer in the conventional sequence.

In an embodiment of the present disclosure, before the brush objects are stored into the brush queue, it is necessary to determine the attributes of each of the brush objects. Besides the brush size and the brush position information, the attributes of the brush object further include a brush color and a brush direction.

In an optional implementation, the brush color of the brush object is determined based on a color value of a pixel corresponding to the brush position information of the brush object on the target image. Specifically, the brush position information of the brush object is determined; then a pixel corresponding to the brush position information on the target image is determined. Thus, the color value of the pixel may be obtained. Finally, the color value of the pixel is determined as the brush color of the brush object. By determining the brush color of the brush object as described, the efficiency of determining the attributes of the brush object can be improved, and thereby the efficiency of generating the image rendering process can be improved.

In addition, the brush direction of the brush object indicates a direction of rendering the brush object. A method for determining the brush direction of the brush object is introduced in subsequent embodiments, which will not be described herein.

In S204, a rendering process of a target style of image corresponding to the target image is generated based on the attributes of the brush objects in the brush queue.

In the method for generating the image rendering process according to the embodiments of the present disclosure, the attributes, such as the brush size and brush position information, of each of the brush objects on the first brush layer set for the target image are determined based on the detail parameter values of the sampled pixels on the first brush layer. Then, the brush objects on the first brush layer are stored into the brush queue corresponding to the first brush layer. Finally, the rendering process of the target style image corresponding to the target image is generated based on the attributes of the brush objects in the brush queue. In the present disclosure, the brush size and the brush position information of the brush objects are determined based on the detail parameter values of sampled pixels. Determinations of the attributes of the brush objects are independent from each other, thus avoiding a mathematical problem of solving an optimal solution to a complex mathematical model. Hence, an efficiency of determining the attributes of the brush objects is improved, and an efficiency of generating the image rendering process based on the attributes of the brush objects is thereby improved.

In addition, in an embodiment of the present disclosure, multiple target rendering regions on the first brush layer are determined, and the target style of image corresponding target image is rendered region by region, which is closer to the true image drawing process and improves user experience.

Based on the descriptions in the above embodiments, an implementation of calculating a detail parameter value of a sampled pixel is provided in an embodiment of the present disclosure. After the pixels in the target rendering region is evenly sampled based on the preset brush interval to obtain the sampled pixels in the target rendering region, the following steps are further performed.

First, a gradient value of the sampled pixel in a first direction and a gradient value of the sampled pixel in a second direction are calculated. Then, a structure tensor matrix corresponding to the sampled pixel is constructed based on the gradient value of the sampled pixel in the first direction and the gradient value of the sampled pixel in the second direction. Then, eigen decomposition is performed on the structure tensor matrix to obtain the detail parameter value of the sampled pixel. The detail parameter value is a greater one of two eigenvalues obtained through the eigen decomposition. The detail parameter value indicates a richness of details of the sampled pixel. The first direction may be an X axis of a coordinate system, and the second direction may be a Y axis of the coordinate system. In the case that the coordinate system is a rectangular coordinate system, the first direction may be a horizontal direction of the rectangular coordinate system, and the second direction may be a vertical direction of the rectangular coordinate system.

In practice, after the sampled pixels is determined, gradient information g_x of the sampled pixel in the horizontal direction (that is, the X axis) and gradient information g_y of the sampled pixel in the vertical direction (that is, the Y axis) are calculated. Then, a structure tensor matrix $T_\sigma$ corresponding to the sampled pixel is constructed using formula (1) based on the gradient information g_x. and g_y. Formula (1) is expressed as:

$$T_\sigma = \begin{bmatrix} g_x^2 * G_\sigma & g_x g_y * G_\sigma \\ g_y g_x * G_\sigma & g_y^2 * G_\sigma \end{bmatrix} \qquad (1)$$

In formula (1), "*" represents a convolution operation, and Go represents a Gaussian kernel with standard deviation σ.

Next, the eigen decomposition is performed on the structure tensor matrix $T_\sigma$ to obtain two eigenvalues s1 and s2 corresponding to the sampled pixel, where s1>=s2. A greater eigenvalue, s1, of the two eigenvalues corresponding to the sampled pixel is the detail parameter value corresponding to the sampled pixel.

The s1 may be used to indicate a richness of details at the sampled pixel. A greater value of s1 indicates that the richness of details corresponding to the sampled pixel is higher, the position corresponding to the sampled pixel is more uneven, and a fineness of rendering is required to be higher. A smaller value of s1 indicates that the richness of details corresponding to the sampled pixel is lower, the position corresponding to the sampled pixel is flatter, and the fineness of rendering is required to be lower.

In practice, after the detail parameter value of the sampled pixel is determined, the attributes, such as the brush position information and the brush size, of the brush object are determined based on the detail parameter value. Specific implementation thereof is introduced in the above embodiments, which are not repeated herein.

In addition, a method for determining a brush direction of a brush object is further provided in an embodiment of the present disclosure. Specifically, the brush direction of the brush object in a target rendering region may be determined based on a direction vector of a sampled pixel corresponding to the brush object.

In an optional implementation, the eigen decomposition on the structure tensor matrix $T_\sigma$ through the formula (1) can not only obtain the two eigenvalues s1 and s2 corresponding to the sampled pixel, but also obtain a eigenvector v1 corresponding to the eigenvalue s1 and a eigenvector v2 corresponding to the eigenvalue s2. The eigenvector v2, which corresponds to the smaller eigenvalue s2, may be used to indicate the direction vector of the sampled pixel. Specifically, in an embodiment of the present disclosure, the brush direction of the brush object is determined based on the eigenvector v2 corresponding to the eigenvalue s2.

In another optional implementation, in order to further improve an efficiency of determining the brush direction, the brush direction of each of the brush objects may be randomly generated. On the premise that the efficiency of determining the brush direction is improved, the efficiency of generating the image rendering process may be improved to a certain extent according to the embodiment of the present disclosure.

In an actual scene of drawing the target style of image, such as an oil painting, a base image is usually drawn first, and then details are further drawn on the base image. In order to be closer to the true image drawing process, a method for generating an image rendering process is further provided according to an embodiment of the present disclosure. FIG. 4 is a flowchart of a method for generating an image rendering process according to another embodiment of the present disclosure. Referring to FIG. 4, on the basis of the above steps with reference to FIG. 2, the method includes S401 to S407.

In S401, an attribute of each of brush objects on a second brush layer set for the target image is determined.

The attribute of each of the brush objects include: a brush size determined based on a preset brush size.

In an embodiment of the present disclosure, the second brush layer may be referred to as a base brush layer. After the target image is determined, the base brush layer is set for the target image, and the attribute of each of the brush objects on the base brush layer is determined. The attribute of each of the brush objects includes a preset brush size.

In an embodiment of the present disclosure, the brush size of each of the brush objects on the base brush layer may be determined based on the preset brush size. Generally, the base may be rendered with a large brush, and therefore the preset brush size can be set to a large brush.

In addition, the brush position information of each of the brush objects on the base brush layer may be determined by sampling pixels on the base brush layer evenly based on a preset brush interval. Position information of the sampled pixel on the base brush layer is determined as the brush position of a corresponding brush object.

In addition, a brush direction of each of the brush objects on the base brush layer may be determined based on a direction vector of a pixel corresponding to the brush object, or may be determined randomly, which will not be limited herein.

In addition, a brush color of the each of the brush objects on the base brush layer may be determined, based on a color value of a pixel corresponding to the brush position information of the brush object on the target image.

In S402, the brush objects on the second brush layer are stored into a brush queue corresponding to the second brush layer.

In an embodiment of the present disclosure, after the attribute of each of the brush objects on the base brush layer is determined, the brush objects are stored into the brush queue created for the base brush layer.

In an optional implementation, in order to be closer to a true image drawing process, the base brush layer may be divided into several target rendering regions, and then a rendering sequence of the brush objects in each of the target rendering regions is disrupted randomly. The brush objects, whose rendering sequence are disrupted, in each of the target rendering region is stored into the brush queue corresponding to the base brush layer in units of target rendering region. Hence, when the base image is rendered, a sequence of brushes rendered in the same target rendering region is irregular and random, while the respective target rendering regions are rendered in a certain sequence. That is, one region is rendered after another region has been rendered. Hence, the true image drawing process is reflected to a maximum extent, and user experience is improved.

In S403, at least one target rendering region is determined on a first brush layer set for the target image.

In S404, a brush size and brush position information of each of brush objects in the target rendering region are determined based on detail parameter values of sampled pixels on the target rendering region.

In S405, the brush objects in the target rendering region are stored sequentially into a brush queue corresponding to the first brush layer, based on a rendering sequence of the at least one target rendering region on the first brush layer.

For an understanding of S403 to S405 in the above embodiment of the present disclosure, reference may be made to the descriptions of S201 to S203 in the foregoing embodiments, and details are not repeated here.

In S406, a rendering sequence is set for the first brush layer and the second brush layer.

In an embodiment of the present disclosure, after the brush queue corresponding to the base brush layer and the brush queue corresponding to the first brush layer are determined respectively, and the brush objects with determined attributes are stored into a corresponding one of the brush queues, the rendering sequence is set for the base brush layer and the first brush layer. In an example, the base brush layer is rendered prior to the first brush layer.

In practice, a process of setting the rendering sequence for the base brush layer and the first brush layer is essentially a process of setting de-queueing sequences of the brush objects in the brush queues corresponding to the base brush layer and the first brush layer, respectively. In an example, the brush objects in the brush queue corresponding to the first brush layer is to be triggered to be de-queued only after the brush objects in the brush queue corresponding to the base brush layer are all de-queued. Hence, it is realized in an image rendering video that the base image is rendered first and then details are rendered, such that the generated image rendering process is closer to the true image drawing process.

In S407, brushes are rendered on a canvas in the rendering sequence, based on the attributes of the brush objects in the brush queue corresponding to the first brush layer and the attributes of the brush objects in the brush queue corresponding to the second brush layer, to generate the rendering process of the target style of image corresponding to the target image.

In an embodiment of the present disclosure, based on the set rendering sequence, the brush objects in the brush queue corresponding to the base brush layer and the brush objects in the brush queue corresponding to the first brush layer are de-queued, respectively. Then, rendering of brushes are performed based on attributes of the de-queued brush objects, and thereby rendering of the base brush layer and rendering of the first brush layer are completed successively. The rendering of the base brush layer refers to rendering a base image of the target style of image corresponding to the target image. The rendering of the first brush layer refers to rendering further details on the base image.

In an embodiment of the present disclosure, an image rendering video corresponding to the target image is generated based on a rendering process of the brush objects on the base brush layer and the first brush layer. In the image rendering process, the rendering of the base brush layer is prior to the rendering of the first brush layer.

In the method for generating the image rendering process according to the embodiments of the present disclosure, the image rendering process corresponding to the target image is finally generated by combining the rendering of the base brush layer and the rendering of the first brush layer. It can be seen that the image rendering process generated in the embodiments of the present disclosure can be closer to the true image drawing process, which further improves the user experience to a certain extent.

In practice, the target image may be a person image, which has a higher requirement on rendering of a face part. Therefore, a method for generating an image rendering process is further provided according to an embodiment of the present disclosure, which strengthens an effect processing on a facial part, on the basis of the above embodiments.

Reference is made to FIG. 5, which is a flowchart of a method for generating an image rendering video according to another embodiment of the present disclosure. On the basis of steps with reference to FIG. 2, the method may further include S501 to S508.

In S501, a facial brush layer is set for the target image based on a human face region on the target image, in response to the target image including a human face.

In an embodiment of the present disclosure, after the target image is determined, it may be detected whether the target image includes a human face.

In an optional implementation, whether the target image includes the human face may be determined by identifying the human face on the target image through face detection.

In an embodiment of the present disclosure, after the human face on the target image is detected, a region containing the human face is determined as a human face region. The human face region is segmented from the target image, and the facial brush layer of the target image is determined based on the segmented human face region. In an example, rendering of the face brush layer specifically refers to rendering details of the human face region on the target image.

In S502, attributes of each of brush objects on the facial brush layer are determined based on an area of the human face region.

The attributes of the brush object include a brush size, brush position information, a brush direction, and a brush color.

In an embodiment of the present disclosure, after the human face region is determined, the brush size of each of the brush objects on the facial brush layer is determined based on the area of the human face region. The human face region with a large area results in a great brush size, that is, a great brush is to be used to render the facial brush layer.

In addition, the brush position information of each of brush objects on the facial brush layer may be determined by evenly sampling pixels on the facial brush layer based on a preset brush interval, and position information of each sampled pixel on the facial brush layer is determined as the brush position information of a corresponding brush object.

In addition, the brush direction of each of the brush objects on the facial brush layer may be determined based on a direction vector of a pixel corresponding to the brush object. Alternatively, the brush direction may be determined randomly, which is not limited herein.

In addition, the brush color of each of the brush objects on the facial brush layer may be determined based on a color value of a pixel corresponding to the brush position information of the brush object on the target image.

In S503, the brush objects on the facial brush layer are stored into a brush queue corresponding to the facial brush layer.

In an embodiment of the present disclosure, after the attributes of each of the brush objects on the facial brush layer are determined, the brush objects are stored into the brush queue created for the facial brush layer.

In an optional implementation, in order to be closer to a true image drawing process, a rendering sequence of the brush objects in the facial brush layer may be disrupted randomly. The brush objects, whose rendering sequence are disrupted, in the facial brush layer are stored into the brush queue corresponding to the facial brush layer. Hence, when the human face is rendered, a sequence of brushes is irregular and random. Hence, the true image drawing process is reflected to a maximum extent, and user experience is improved.

In S504, at least one target rendering region is determined on a first brush layer set for the target image.

In S505, attributes of each of brush objects in the target rendering region are determined based on detail parameter values of sampled pixels on the target rendering region.

In S506, the brush objects in the target rendering region are stored sequentially into a brush queue corresponding to the first brush layer, based on a rendering sequence of the at least one target rendering regions on the first brush layer.

For an understanding of the S504 to S506 in the above embodiment of the present disclosure, reference may be made to the descriptions of S201 to S203 in the foregoing embodiments, details of which will not be repeated herein.

In S507, a rendering sequence is set for the first brush layer and the facial brush layer.

In an embodiment of the present disclosure, after determining the brush queue corresponding to the facial brush layer and the brush queue corresponding to the first brush layer are determined and the brush objects with determined attributes are stored into a corresponding one of the brush queues, the rendering sequence is set for the facial brush and the first brush layer. In an example, the first brush layer is rendered prior to the facial brush layer.

In practice, a process of setting the rendering sequence for the facial brush layer and the first brush layer is essentially a process of setting de-queueing sequences of the brush objects in the brush queue corresponding to the facial brush layer and the first brush layer, respectively. In an example, the brush objects in the brush queue corresponding to the facial brush layer is to be triggered to be de-queued only after the brush objects in the brush queue corresponding to the first brush layer are all de-queued. Hence, it is realized in an image rendering video that the first brush layer is rendered first and then details of the human face are rendered, such that the generated image rendering process is closer to the true image drawing process.

In S508, brushes are rendered on a canvas in accordance with the rendering sequence, based on the attributes of the brush objects in the brush queue corresponding to the first brush layer and the attributes of the brush objects in the brush queue corresponding to the facial brush layer, to generate the rendering process of the target style of image corresponding to the target image.

In an embodiment of the present disclosure, based on the set rendering sequence, the brush objects in the brush queue corresponding to the first brush layer and the brush objects in the brush queue corresponding to the facial brush layer are de-queued, respectively, based on the set rendering sequence. Then, rendering of brushes are performed based on attributes of the de-queued brush objects, and thereby rendering of the first brush layer and rendering of the facial brush layer are completed successively. The rendering of the first brush layer refers to rendering an overall screen of the target style of image corresponding to the target image, and the rendering of the facial brush layer refers to rendering of the human face details based on the overall screen.

In an embodiment of the present disclosure, an image rendering video corresponding to the target image is generated based on a rendering process of the brush objects on the facial brush layer and the first brush layer. In the image rendering process, the rendering of the first brush layer is prior to the rendering of the facial brush layer.

In the method for generating the image rendering process according to the embodiments of the present disclosure, details of the human face region in the person image are rendered based on the facial brush layer. Thus, the generated image rendering process can be closer to the true image drawing process, which further improves the user experience.

On the basis of the above embodiments, the base brush layer, the first brush layer, and the facial brush layer may be combined and rendered sequentially according to an embodiment of the present disclosure, so as to finally generate the image rendering process corresponding to the target image. In this way, a true image drawing process is realized, in which the base image is first rendered, then details are rendered on the base image, and finally details of the human face are rendered in the image rendering video. Thereby, the user experience is improved.

A specific implementation of combining and rendering the base brush layer, the first brush layer, and the facial brush layer sequentially, and generating the image rendering process corresponding to the target image may be understood in conjunction with the above embodiments, which are not repeated here.

In addition, in order to further improve a quality of a final rendered image in the image rendering process, an effect process, such as sharpening, may be performed on the image rendered through the image rendering process according to an embodiment of the present disclosure. In an example, a sharpened image is added to the last part of the generated image rendering process as the last several image frames of the image rendering process, so as to enhance definition of the rendered image.

In addition, the image rendering video may further include image frames in which a bump mapping effect is applied to the image, so that the target style of image rendered through the image rendering process can reflect an effect of truly drawing the image to a maximum extent.

Figure 6:
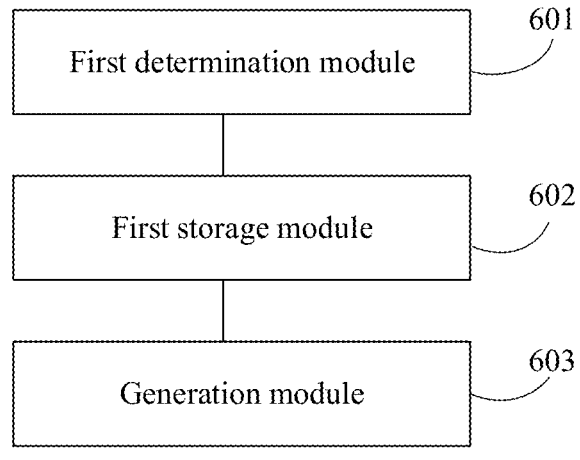
FIG. 6 is a structural block diagram of a device for generating an image rendering process according to an embodiment of the present disclosure.

Corresponding to the above method embodiments, a device for generating an image rendering process is further provided according to the present disclosure. Reference is made to FIG. 6, which is a schematic structural diagram of a device for generating an image rendering process according to an embodiment of the present disclosure. The device includes a first determination module 601, a first storage module 602, and a generation module 603.

The first determination module 601 is configured to determine attributes of each of brush objects on a first brush layer set for a target image, based on detail parameter values of sampled pixels on the first brush layer, where the attributes include a brush size and brush position information.

The first storage module 602 is configured to store the brush objects on the first brush layer into a brush queue corresponding to the first brush layer.

The generation module 603 is configured to generate a rendering process of a target style of image corresponding to the target image, based on the attributes of the brush objects in the brush queue.

In an optional implementation, the first determining module 601 includes a first determination submodule and a second determination submodule.

The first determination submodule is configured to determine at least one target rendering region on the first brush layer set for the target image.

The second determination submodule is configured to determine the attributes of each of brush objects in the target rendering region based on detail parameter values of sampled pixels in the target rendering region. The detail parameter value indicates a richness of details of the sampled pixel.

The first storage module 603 is specifically configured to store the brush objects within the target rendering region into the brush queue corresponding to the first brush layer sequentially, in accordance with a rendering sequence of the at least one target rendering region on the first brush layer.

In an optional implementation, the first determination module includes a sampling submodule, a first calculation submodule, a detection submodule, and a third determination submodule.

The sampling submodule is configured to sample pixels in the target rendering region based on a preset brush interval, to obtain the sampled pixels in the target rendering region.

The first calculation submodule is configured to calculate the detail parameter value of each of the sampled pixels.

The detection submodule is configured to determine whether the detail parameter value is within a detail range corresponding to the preset brush interval. The detail parameter value indicates a richness of details of the sampled pixel.

The third determination submodule is configured to determine the brush position information of the brush object based on position information of the sampled pixel and determine a brush size corresponding to the preset brush interval as the brush size of the brush object, in response to the detail parameter value being within the detail range corresponding to the preset brush interval.

In an optional implementation, the first calculation submodule includes a second calculation submodule, a construction submodule, and a decomposition submodule.

The second calculation submodule is configured to calculate a gradient value of the sampled pixel in a first direction and a gradient value of the sampled pixel in a second direction.

The construction submodule is configured to construct a structure tensor matrix corresponding to the sampled pixel, based on the gradient value of the sampled pixel in the first direction and the gradient value of the sampled pixel in the second direction.

The decomposition submodule is configured to perform eigen decomposition on the structure tensor matrix to obtain the detail parameter value of the sampled pixel. The detail parameter value is a greater eigenvalue of two eigenvalues obtained through the eigen decomposition, and the detail parameter value indicates a richness of details of the sampled pixel.

In an optional implementation, the attributes of the brush object further include a brush direction, and the device further includes a second determination module.

The second determination module is configured to determine the brush direction of the brush object corresponding to the sampled pixel, based on a direction vector corresponding to a smaller eigenvalue of the two eigenvalues.

In an optional implementation, the device further includes a disrupting module.

The disrupting module is configured to disrupt a rendering sequence of the brush objects within the target rendering region randomly.

In an optional implementation, the attributes of the brush object further include a brush color, and the brush color is determined based on a color value of a pixel corresponding to the brush position information of the brush object on the target image.

In an optional implementation, the device further includes a third determination module and a second storage module.

The third determination module is configured to determine attributes of each of brush objects on a second brush layer set for the target image.

The second storage module is configured to store the brush objects on the second brush layer into a brush queue corresponding to the second brush layer.

The generation module includes a first setting submodule and a first generation submodule.

The first setting submodule is configured to set a rendering sequence for the first brush layer and the second brush layer.

The first generation submodule is configured to render the brush objects on a canvas in accordance with the rendering sequence, based on the attributes of the brush objects in the brush queue corresponding to the first brush layer and the attributes of the brush objects in the brush queue corresponding to the second brush layer, to generate the rendering process of the target style of image corresponding to the target image.

In an optional implementation, the fourth determining module includes a sampling submodule and a fourth determination submodule.

The sampling submodule is configured to sampling pixels on the second brush layer evenly based on a preset brush interval, to obtain sampled pixels on the second brush layer.

The fourth determination submodule is configured to determine position information of the sampled pixel as the brush position information of the brush object on the second brush layer, and determine a preset brush size corresponding to the preset brush interval as the brush size of the brush object.

In an optional implementation, the device further includes a first setting module, a fourth determination module, and a third storage module.

The first setting module is configured to set, in response to the target image including a human face, a facial brush layer for the target image based on a human face region on the target image.

The fourth determination module is configured to determining the attributes of each of brush objects on the facial brush layer based on the area of the human face region.

The third storage module is configured to store the brush objects on the facial brush layer into a brush queue corresponding to the facial brush layer.

The generation module includes a second setting submodule, and a second generation submodule.

The second setting submodule is configured to set rendering sequence for the first brush layer and the facial brush layer.

The second generation submodule is configured to render the brush objects on a canvas in accordance with the rendering sequence, based on the attributes of the brush objects in the brush queue corresponding to the first brush layer and the attributes of the brush objects in the brush queue corresponding to the facial brush layer, to generate the rendering process of the target style of image corresponding to the target image.

In an optional implementation, the first determination submodule is specifically configured to determine the at least one target rendering region on the first brush layer set for the target image, based on a similarity of color values of the pixels on the target image.

In an optional implementation, the device further includes an effect addition module.

The effect addition module is configured to apply a bump mapping effect on the target style of image corresponding to the target image, after generating the target style of image.

With the device for generating the image rendering process according to the embodiment of the present disclosure, the attributes, such as a brush size and brush position information of each of the brush objects on the first brush layer set for the target image are determined based on the detail parameter values of the sampled pixels on the first brush layer. Then, the brush objects on the first brush layer are stored into the brush queue corresponding to the first brush layer. Finally, the rendering process of the target style of image corresponding to the target image is generated based on the attributes of the brush objects in the brush queue. In the present disclosure, the brush size and the brush position information of a corresponding brush object are determined based on the detail parameter values of the sampled pixels. Determinations of the attributes of the brush objects are independent from each other, thus avoiding a mathematical problem of solving an optimal solution to a complex mathematical model. Hence, an efficiency of determining the attributes of the brush objects is improved, and an efficiency of generating the image rendering process based on the attributes of the brush objects is thereby improved.

In addition to the above method and device, a computer-readable storage medium is further provided in an embodiment of the present disclosure. The computer-readable storage medium stores instructions. The instructions, when executed on a terminal device, cause the terminal device to implement the method for generating the image rendering process disclosed in the present disclosure.

Figure 7:
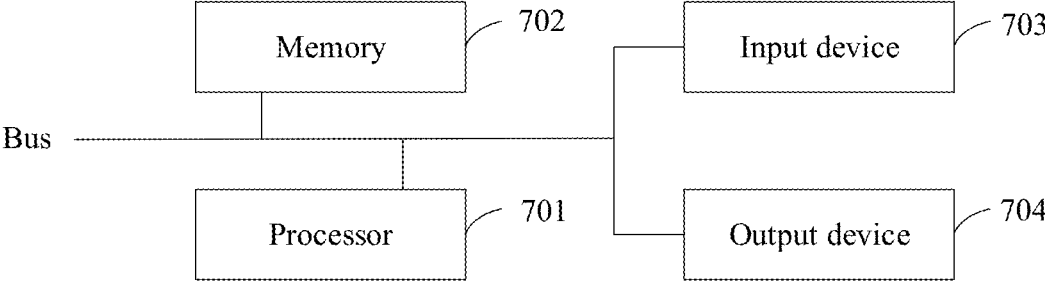
FIG. 7 is a structural block diagram of an apparatus for generating an image rendering process according to an embodiment of the present disclosure.

In addition, an apparatus for generating an image rendering process is further provided in an embodiment of the present disclosure. Reference is made to FIG. 7. The apparatus may include a processor 701, a memory 702, an input device 703 and an output device 704.

The number of processor 701 in the apparatus may be one or more. As shown in FIG. 7, a single processor is taken as an example. In some embodiments of the present disclosure, the processor 701, the memory 702, the input device 703 and the output device 704 may be connected via a bus or in other ways. In FIG. 7, the processor 701, the memory 702, the input device 703 and the output device 704 are connected via a bus, as an example.

The memory 702 stores software programs and modules, and the processor 701 executes various data processing and functional applications of the apparatus for generating the image rendering process by executing the software programs and modules stored in the memory 702. The memory 702 may mainly include a storage program area and a storage data area. The storage program area may store an operating system, an application program required for at least one function, and the like. In addition, the memory 702 may include a high-speed random access memory, and may further include a nonvolatile memory, such as at least one disk storage device, a flash memory device, or other volatile solid-state storage devices. The input device 703 may be configured to receive input digital or character information and generate signal inputs related to user settings and functional control of the apparatus for generating the image rendering process.

Specifically, in an embodiment, the processor 701 may load executable files corresponding to processes of one or more application programs into the memory 702 in response to instructions. The processor 701 may execute the applications stored in the memory 702, so as to realizing various functions of the apparatus for generating the image rendering process.

It should be noted that the relational terms in this specification such as "first", "second", and the like, are used to distinguish an entity or operation from another entity or operation, rather than to necessarily require or imply any actual relationship or order of these entities or operations. Moreover, terms "comprise", "include", and variations thereof used herein are intended to be non-exclusive. Therefore, a process, method, article, or apparatus including a series of elements includes not only the listed elements, but further include other elements not explicitly listed or inherent to the process, method, article, or apparatus. Without further restrictions, an element defined by a statement "include a(n) . . . " do not exclude existence of other identical elements in a process, method, article or apparatus including the element.

Hereinabove described are specific embodiments of the present disclosure, which enables those skilled in the art to understand or implement the present disclosure. Various modifications to the embodiments are apparent to those skilled in the art. General principles defined herein may be implemented in other embodiments without departing the sprit or scope of the present disclosure. Therefore, the present disclosure would not be limited to the embodiments described in this specification, but shall conform to the widest scope consistent with the principles and novel features disclosed herein.

The invention claimed is:

1. A method for generating an image rendering process, comprising:

determining attributes of each of brush objects on a first brush layer set for a target image, based on detail parameter values of sampled pixels on the first brush layer, wherein the attributes comprise a brush size and brush position information;

storing the brush objects on the first brush layer, into a brush queue corresponding to the first brush layer; and generating a rendering process of a target style of image corresponding to the target image, based on the attributes of the brush objects in the brush queue, wherein the determining the attributes of each of the brush objects on the first brush layer set for the target image, based on the detail parameter values of the sampled pixels on the first brush layer, comprises:

determining at least one target rendering region on the first brush layer set for the target image; and determining the attributes of each of brush objects in the target rendering region based on the detail parameter values of the sampled pixels in the target rendering region; and storing the brush objects on the first brush layer, into the brush queue corresponding to the first brush layer comprises:

storing the brush objects within the target rendering region into the brush queue corresponding to the first brush layer sequentially, in accordance with a rendering sequence of the at least one target rendering region on the first brush layer.

2. The method according to claim 1, wherein the determining the attributes of each of the brush objects on the first brush layer set for the target image, based on the detail parameter values of the sampled pixels on the first brush layer, comprises:

sampling pixels on the first brush layer evenly based on a preset brush interval, to obtain the sampled pixels on the first brush layer;

calculating a detail parameter value of each of the sampled pixels, and determining whether the detail parameter value is within a detail range corresponding to the preset brush interval, wherein the detail parameter value indicates a richness of details of the sampled pixel; and determining the brush position information of the brush object based on position information of the sampled pixel, and determining a brush size corresponding to the preset brush interval as the brush size of the brush object, in response to the detail parameter value being within the detail range corresponding to the preset brush interval.

3. The method according to claim 2, wherein the calculating the detail parameter value of each of the sampled pixels comprises:

calculating a gradient value of the sampled pixel in a first direction and a gradient value of the sampled pixel in a second direction;

constructing a structure tensor matrix corresponding to the sampled pixel, based on the gradient value of the sampled pixel in the first direction and the gradient value of the sampled pixel in the second direction; and performing eigen decomposition on the structure tensor matrix to obtain the detail parameter value of the sampled pixel, wherein the detail parameter value is a greater eigenvalue of two eigenvalues obtained through the eigen decomposition, and the detail parameter value indicates a richness of details of the sampled pixel.

4. The method according to claim 3, wherein the attributes of the brush object further comprise a brush direction, and the method further comprises:

determining the brush direction of the brush object corresponding to the sampled pixel, based on a direction vector corresponding to a smaller eigenvalue of the two eigenvalues.

5. The method according to claim 1, wherein before storing the brush objects within the target rendering region into the brush queue corresponding to the first brush layer sequentially, in accordance with a rendering sequence of the at least one target rendering region on the first brush layer, the method further comprises:

disrupting a rendering sequence of the brush objects within the target rendering region randomly.

6. The method according to claim 1, wherein the attributes of the brush object further comprise a brush color; and the brush color is determined based on a color value of a pixel corresponding to the brush position information of the brush object on the target image.

7. The method according to claim 1, wherein before generating a rendering process of a target style of image corresponding to the target image, based on the attributes of the brush objects in the brush queue, the method further comprises:

determining attributes of each of brush objects on a second brush layer set for the target image; and storing the brush objects on the second brush layer, into a brush queue corresponding to the second brush layer; and the generating the rendering process of the target style of image corresponding to the target image based on the attributes of the brush objects in the brush queue comprises:

setting a rendering sequence for the first brush layer and the second brush layer; and rendering the brush objects on a canvas in accordance with the rendering sequence, based on the attributes of the brush objects in the brush queue corresponding to the first brush layer and the attributes of the brush objects in the brush queue corresponding to the second brush layer, to generate the rendering process of the target style of image corresponding to the target image.

8. The method according to claim 7, wherein the determining attributes of each of brush objects on the second brush layer set for the target image comprises:

sampling pixels on the second brush layer evenly based on a preset brush interval, to obtain sampled pixels on the second brush layer; and determining position information of the sampled pixels as the brush position information of the brush objects on the second brush layer, and determining a preset brush size corresponding to the preset brush interval as the brush size of the brush object.

9. The method according to claim 1, wherein before generating the rendering process of the target style of image corresponding to the target image, based on the brush objects in the brush queue, the method further comprises:

setting, in response to the target image comprising a human face, a facial brush layer for the target image based on a human face region on the target image;

determining attributes of each of brush objects on the facial brush layer based on an area of the human face region; and storing the brush objects on the facial brush layer, into a brush queue corresponding to the facial brush layer; and the generating the rendering process of the target style of image corresponding to the target image, based on the attributes of the brush objects in the brush queue, comprises:

setting a rendering sequence for the first brush layer and the facial brush layer; and rendering the brush objects on a canvas in accordance with the rendering sequence, based on the attributes of the brush objects in the brush queue corresponding to the first brush layer and the attributes of the brush objects in the brush queue corresponding to the facial brush layer, to generate the rendering process of the target style of image corresponding to the target image.

10. The method according to claim 1, wherein the determining at least one target rendering region on the first brush layer set for the target image comprises:

determining the at least one target rendering region on the first brush layer set for the target image, based on a similarity of color values of pixels on the target image.

11. The method according to claim 1, wherein after generating the rendering process of the target style of image corresponding to the target image, based on the brush objects in the brush queue, the method further comprises:

applying a bump mapping effect on the target style of image corresponding to the target image, after generating the target style of image corresponding to the target image.

12. A non-transitory computer-readable storage medium, wherein the computer-readable storage medium stores instructions, and the instructions, when executed on a terminal device, cause the terminal device to:

determine attributes of each of brush objects on a first brush layer set for a target image, based on detail parameter values of sampled pixels on the first brush layer, wherein the attributes comprise a brush size and brush position information;

store the brush objects on the first brush layer, into a brush queue corresponding to the first brush layer; and generate a rendering process of a target style of image corresponding to the target image, based on the attributes of the brush objects in the brush queue, wherein the instructions, when executed on a terminal device, cause the terminal device to:

determine at least one target rendering region on the first brush layer set for the target image; and determine the attributes of each of brush objects in the target rendering region based on the detail parameter values of the sampled pixels in the target rendering region; and store the brush objects within the target rendering region into the brush queue corresponding to the first brush layer sequentially, in accordance with a rendering sequence of the at least one target rendering region on the first brush layer.

13. An apparatus, comprising:

a memory, a processor, and a computer program stored in the memory and executable on the processor, wherein the processor, when executing the computer program, performs a method for generating an image rendering process, wherein the method comprises:

determining attributes of each of brush objects on a first brush layer set for a target image, based on detail parameter values of sampled pixels on the first brush layer, wherein the attributes comprise a brush size and brush position information;

storing the brush objects on the first brush layer, into a brush queue corresponding to the first brush layer; and generating a rendering process of a target style of image corresponding to the target image, based on the attributes of the brush objects in the brush queue, wherein the determining the attributes of each of the brush objects on the first brush layer set for the target image, based on the detail parameter values of the sampled pixels on the first brush layer, comprises:

determining at least one target rendering region on the first brush layer set for the target image; and determining the attributes of each of brush objects in the target rendering region based on the detail parameter values of the sampled pixels in the target rendering region; and storing the brush objects on the first brush layer, into the brush queue corresponding to the first brush layer comprises:

storing the brush objects within the target rendering region into the brush queue corresponding to the first brush layer sequentially, in accordance with a rendering sequence of the at least one target rendering region on the first brush layer.

14. The apparatus according to claim 13, wherein the determining the attributes of each of the brush objects on the first brush layer set for the target image, based on the detail parameter values of the sampled pixels on the first brush layer, comprises:

sampling pixels on the first brush layer evenly based on a preset brush interval, to obtain the sampled pixels on the first brush layer;

calculating a detail parameter value of each of the sampled pixels, and determining whether the detail parameter value is within a detail range corresponding to the preset brush interval, wherein the detail parameter value indicates a richness of details of the sampled pixel; and determining the brush position information of the brush object based on position information of the sampled pixel, and determining a brush size corresponding to the preset brush interval as the brush size of the brush object, in response to the detail parameter value being within the detail range corresponding to the preset brush interval.

15. The apparatus according to claim 14, wherein the calculating the detail parameter value of each of the sampled pixels comprises:

calculating a gradient value of the sampled pixel in a first direction and a gradient value of the sampled pixel in a second direction;

constructing a structure tensor matrix corresponding to the sampled pixel, based on the gradient value of the sampled pixel in the first direction and the gradient value of the sampled pixel in the second direction; and performing eigen decomposition on the structure tensor matrix to obtain the detail parameter value of the sampled pixel, wherein the detail parameter value is a greater eigenvalue of two eigenvalues obtained through the eigen decomposition, and the detail parameter value indicates a richness of details of the sampled pixel.

16. The apparatus according to claim 15, wherein the attributes of the brush object further comprise a brush direction, and the method further comprises:

determining the brush direction of the brush object corresponding to the sampled pixel, based on a direction vector corresponding to a smaller eigenvalue of the two eigenvalues.

17. The apparatus according to claim 13, wherein before storing the brush objects within the target rendering region into the brush queue corresponding to the first brush layer sequentially, in accordance with a rendering sequence of the at least one target rendering region on the first brush layer, the method further comprises:

disrupting the rendering sequence of the brush objects within the target rendering region randomly.

18. The apparatus according to claim 13, wherein the attributes of the brush object further comprise a brush color; and the brush color is determined based on a color value of a pixel corresponding to the brush position information of the brush object on the target image.

* * * * *